United States Patent
Erickson

[15] 3,659,220
[45] Apr. 25, 1972

[54] LASER CONSTRUCTION
[72] Inventor: Edward G. Erickson, Oakland, N.J.
[73] Assignee: Holobeam, Inc., Paramus, N.J.
[22] Filed: Nov. 2, 1970
[21] Appl. No.: 86,347

Related U.S. Application Data

[63] Continuation of Ser. No. 843,371, July 22, 1969, abandoned.

[52] U.S. Cl. ................................ 331/94.5, 330/4.3
[51] Int. Cl. ............................ H01s 3/04, H01s 3/02
[58] Field of Search ...................... 331/94.5; 330/4.3

[56] References Cited

UNITED STATES PATENTS

| | | | |
|---|---|---|---|
| 3,356,966 | 12/1967 | Miller | 331/945 |
| 3,172,056 | 3/1965 | Stitch | 331/94.5 |
| 3,244,412 | 4/1966 | Robinston et al. | 263/40 |
| 3,262,070 | 7/1966 | Reuter et al. | 331/94.5 |
| 3,172,056 | 3/1965 | Stitch | 331/94.5 |
| 3,244,412 | 4/1966 | Robinson et al. | 263/40 |
| 3,262,070 | 7/1966 | Reuter et al. | 331/94.5 |
| 3,356,966 | 12/1967 | Miller | 331/94.5 |
| 3,582,816 | 6/1971 | Waszak | 331/94.5 |

OTHER PUBLICATIONS

Gurs et al., " High Symmetry Oscillation Types in a Continuous Water Cooled Laser with Neodymium in Calcium Tungstate," Zeitschruft fur Naturforschung 19a (12) 1 Dec. 1964, pp 1357– 1362

Caskey, " Hair–Trigger Operation of a Neodymium Laser," NOLTR 64– 32, AD 436893, pp i, v, 10, 11, 14– 17, and 19– 21.

Daw et al., " Cast Plastic Laser Pump Cavities," applied Optics, 3, (8), August 1964, pp. 984– 985.

Caskey, " Hair Trigger Operation of a Nd Laser," NOLTR 64– 32, AD 436893, pp iv, 10, 11, 14– 17, 19– 21.

Daw et al., Applied Optics, 3, (8) August 1964, pp. 984– 985.
Gurs et al., Zeitschrift fur Naturforschung, Vol 19a, No. 12, 1 Dec. 1964, pp. 1357– 1362.

*Primary Examiner*—Ronald L. Wibert
*Assistant Examiner*—R. J. Webster
*Attorney*—Sandoe, Hopgood and Calimafde

[57] ABSTRACT

The invention contemplates a laser-head construction in which a unit-handling elongated prismatic plastic body, with simple externally accessible electrical and coolant-fluid connections, fully contains and supports the laser rod, its light source or sources and the reflecting-cavity means by which light flux is concentrated on the laser rod. The plastic body contains all coolant-fluid passages, and the reflecting-cavity wall is utilized as part of the coolant-circulating system, the entire interior of the body being flooded with coolant. By having the plastic transparent, the laser may be observed in operation with visual access to the coolant system, and heat may be more readily dissipated from within the laser head.

16 Claims, 9 Drawing Figures

INVENTOR
EDWARD G. ERICKSON
BY
Sandoe, Hopgood & Calimafde
ATTORNEYS

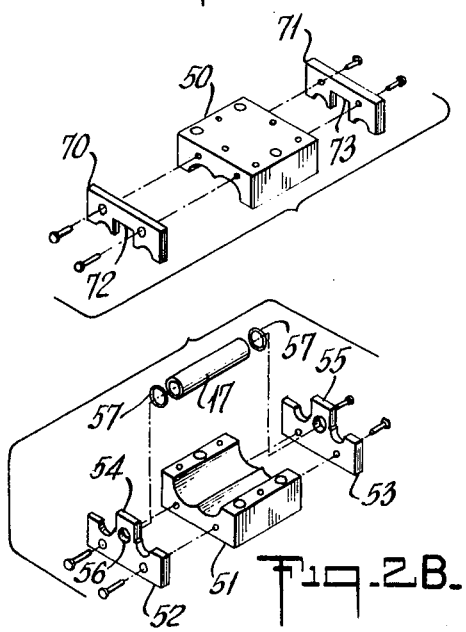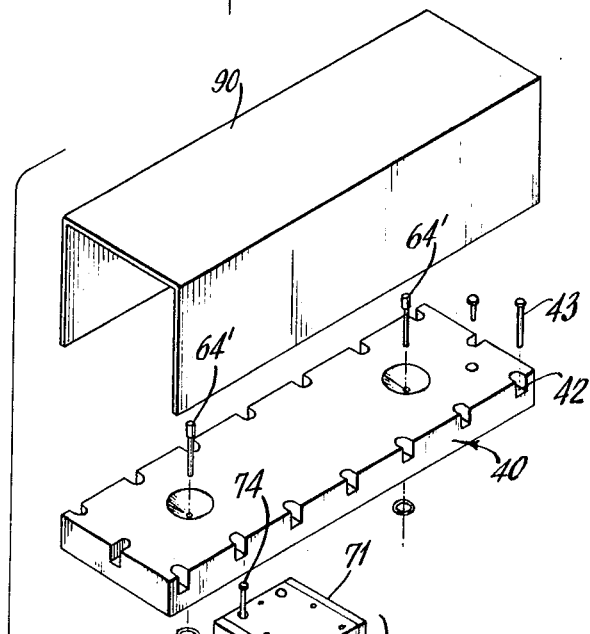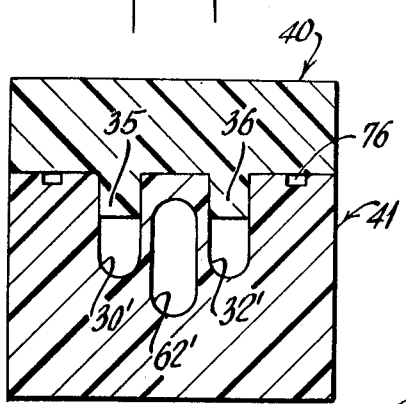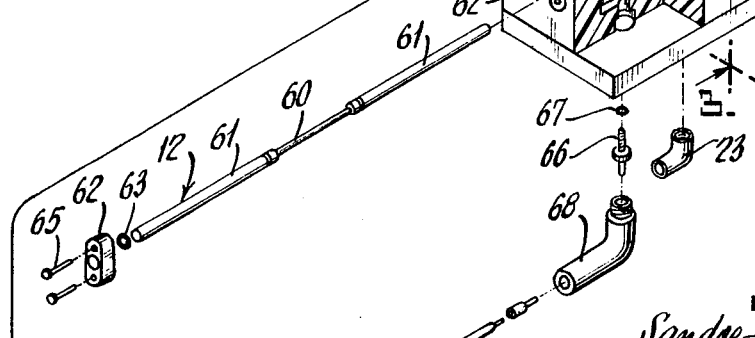

3,659,220

LASER CONSTRUCTION

This application is a continuation of Ser. No. 843,371, filed July 22, 1969, now abandoned.

This invention relates to a laser-head construction, as for rod-type lasers.

Lasers of the character indicated are known in which a reflector body is provided with a reflector cavity, to enable concentrated light-source impingement ("pumping") on a laser rod. Much heat is generated within the cavity, and separate elongated transparent coolant tubes have been provided to establish independent coolant circulation for the rod and for the light source. Such construction has necessitated complex plumbing connections with attendant seal problems, and there have been additional problems of providing adequate electrical supply and assurance that a given desired optical orientation and alignment will be maintained. Furthermore, the reflecting surface itself, being spaced from the coolant tubes, has deteriorated rapidly in spite of provision for relatively great coolant flow, for a given excitation power level.

It is, accordingly, an object of the invention to provide an improved laser head avoiding the foregoing problems.

Another object is to provide a substantially more rugged laser-head construction, with inherent capability to provide precise orientation of the laser rod even in the presence of vibration.

A further object is to provide a unitary laser-head construction having inherently greater power-handling capacity than heretofore, for a given-overall volume.

Still further objects are to achieve the foregoing with a construction of elemental simplicity, having longer life at high efficiency, with improved heat-dissipating effectiveness and with far greater ease of assembly, of adjustment and of maintenance than heretofore.

Other objects and various further features of novelty and invention will be pointed out or will occur to those skilled in the art from a reading of the following specification in conjunction with the accompanying drawings. In said drawings, which show, for illustrative purposes only, preferred and other embodiments of the invention:

FIG. 2 is an exploded perspective view of the complete laser head;

FIGS. 2A and 2B are similar exploded views of separate subassemblies in FIG. 2;

FIG. 3 is an enlarged transverse sectional view taken substantially at the plane 3—3 of FIG. 2;

Briefly stated, the invention contemplates a laser-head construction in which a unit-handling elongated prismatic plastic body, with simple externally accessible electrical and coolant-fluid connections, fully contains and supports the laser rod, its light source or sources and the reflecting-cavity means by which light flux is concentrated on the laser rod. The plastic body contains all coolant-fluid passages, and the reflecting-cavity wall is utilized as part of the coolant-circulating system, the entire interior of the body being flooded with coolant. By having the plastic transparent, the laser may be observed in operation with visual access to the coolant system, and heat may be more readily dissipated from within the laser head.

Figure 1:
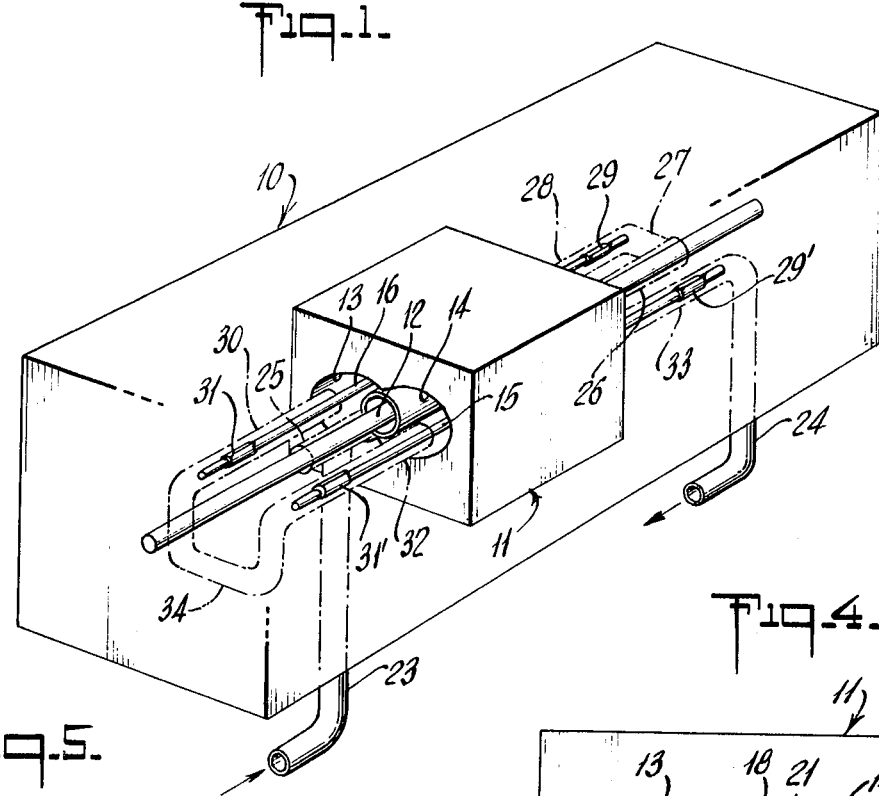
FIG. 1 is a simplified view in perspective of a laser head of the invention, certain parts being omitted and others merely suggested by broken and phantom lines, to show the overall internal relation of parts.

Referring to FIG. 1, the invention is shown in application to a laser head 10 comprising a prismatic block or body of a material selected for its electrically insulating and heat-transmitting properties. Preferably, also, this material is transparent, non-porous to water, non-soluble, and easily machinable; ability to absorb ultra-violet radiation is also desired, for personal safety. In use thus far, highly satisfactory operation has been achieved with an acrylic plastic, such as Plexiglas, which may be filled or unfilled, as dictated by strength requirements in particular applications.

Figure 4:
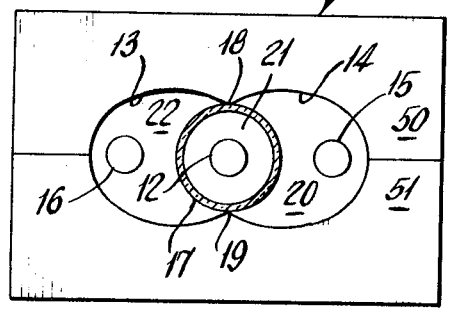
FIG. 4 is a simplified transverse sectional view of the light-pumping region of the laser head of FIGS. 1 and 2.

Suitably mounted within a longitudinally central cavity in head 10 is a reflector body 11 having a reflecting cavity which is open at both longitudinal ends. Elongated pumplight means and laser rod means 12 are positioned on spaced parallel axes within the reflecting cavity; in the form shown (see also FIG. 4), the reflecting cavity is provided by intersecting elliptically cylindrical surfaces 13–14, wherein all focal axes are in the same horizontal plane, with one focal axis common to both surfaces 13–14. A first pumping light source 15 is positioned on one of the other focal axes, as is also a second such source 16 on the remaining focal axis.

In accordance with a feature of the invention, a transparent member 17, which may be a quartz tube (or of uranium glass), serves to physically divide the reflector-cavity region surrounding laser-rod means 12, from further reflector-cavity regions separately surrounding the respective light sources 15–16; and reflecting-cavity surfaces are utilized to form portions of these divided regions. As shown, the dividing member 17 coacts with the upper and lower ellipse-intersection lines 18–19, to define a first region 20 surrounding lamp 15 (between reflecting cavity 14 and half tube 17), a second region 21 surrounding laser-rod means 12, and a third region 22 surrounding lamp 16. All of these regions 20–21–22 are open at both ends of the reflector body 11 and have separate connection to a system of coolant passages integrally embodied in the unitary construction of the plastic head body or block 10. FIG. 1 will be understood to suggest provision of such passages in block 10, between externally accessible inlet and outlet port fittings 23–24. These passages separately communicate with the respective regions 20–21–22 to assure separate longitudinal courses of flow therein, and to the adjacent regions of support for the lamps 15–16 and rod 12.

As shown, all courses of flow are series-connected, commencing with a first longitudinal passage 25 surrounding one support end for rod 12; passage 25 receives fresh coolant from inlet 23 and communicates with the central annular region 21, for direct surface-contact cooling of the laser rod. At the other longitudinal end, a second longitudinal passage 26 surrounds the other support region for rod 12 and receives coolant from region 21, passing the same laterally, via an offset 27, to a third longitudinal passage 28 which surrounds support means 29 for one end of the light source 16. Coolant fluid from passage 28 floods the reflector region 22 before passing into a fourth longitudinal passage 30 surrounding the support means 31 for the other end of the light source 16. Fifth and sixth similar longitudinal passages 32–33 serve the supports for lamp 15 and communicate with reflector region 20, receiving coolant from passage 30 via an offset 34, and discharging to the outlet 24.

Reference will now be made to FIGS. 2, 2A, 2B and 3 for a more detailed description of the construction of head 10 and its contents.

The prismatic block or body, generally designated 10 in FIG. 1, is seen in FIG. 2 to comprise interfitting separable upper and lower halves or parts 40–41 having aligned means 42–42' at peripherally spaced locations to receive securing bolts (43). A generally central prismatic cavity 44 includes parallel upstanding end walls, as at 45, for removably insertable reception of a similarly shaped reflector-body member 46, corresponding to the body 11 previously described. The body parts 40–41 are preferably of the nature already described, i.e., of transparent plastic, and for mounting purposes, a rigid base plate 47 may be provided with means (not shown) for secure attachment to the lower body part 41. Plate 47 need not be of plastic and may conveniently be of metal, such as brass or aluminum.

The plastic lower body 41 is shown with upwardly open longitudinal grooves or channels which become closed to define the coolant passages 25–26–28–30–32–33 upon assembly to the top body part 40. As seen in FIG. 3, downwardly projecting ribs 48–49 integrally formed in the underside of part 40, fit between upstanding sidewalls of the longitudinal channels and thus define the indicated passages; for ease of recognition, therefore, in FIG. 2, these channels are identified by the same reference numbers as the passages they help define, except that primed notation is employed in FIG. 2. When the body parts are assembled, as in FIG. 3, the coolant passages will be understood to align and communicate with independent fluid courses or regions 20-21-22, as already described.

In the form shown, the reflector body 46 is of metal such as brass, formed as mating upper and lower halves 50-51, each of which is recessed with half of both the intersecting elliptically cylindrical reflecting surfaces. In the case of the lower body half 51, upstanding end plates 52-53 are secured to determine upstanding central arms 54-55 with aligned bores (56) on the common focal axis of the two ellipses. It will be understood that when plates 52-53 are secured, the tube 17, with appropriate O-ring or other resilient gasket means 57 may correctly position tube 17 to fulfill the condition already described in connection with FIGS. 1 and 4. This constitutes a subassembly 51-52-53-17 (FIG. 2B) which is bodily inserted into the cavity 44, and securing means, such as bolt 58, are set to hold this subassembly to the lower plastic body part 41.

Thus assembled, the bore of tube 17 will be understood to be aligned with passages 25-26 and with longitudinally continuous laser-support bores, such as bore 59 in FIG. 3, within the respective end masses of body part 41. It is thus appropriate at this juncture to insert and secure the laser-rod subassembly 12 within these aligned bores and passages; in the form shown, the laser rod 60 itself is held concentrically within tube 17, while supporting end tubes 61 are secured in the bores (59) of body 41. End-mounting blocks, as at 62, are bored to receive the longitudinally outer ends of tubes 61, with resilient O-ring insulation at 63, and at more longitudinally inward locations, angularly spaced positioning screws (64—64') give precise and firm orientation, and small adjustment of orientation, as may be needed for the respective ends of laser rod 60. As shown, end blocks 62 are received in suitable recesses 62' in body 41, and bolts 65 complete their assembly to body 41.

The lamp supports 29'-31' will be recognized in FIG. 2 as having bases received in the further-recessed bottoms of grooves 32'-33', where they are secured by bolt means 66 and gasket 67 for externally accessible electrical-supply connection, as via conduit means 68. Thus mounted, supports 29'-31a⅔ are seen as spring-clip fingers for removably inserted reception of the end-electrode connections of the elongated light source or pump 15, the same being held in coaxial relation with the remaining focal axis of the reflector surface 14. In like manner, the second light pump 16 is supported and supplied, within grooves 28'-30', as will be understood.

Having thus assembled the laser-rod unit 12 and the lamps 15-16, the upper subassembly of the reflector body is inserted and secured, within cavity 44 and in interlocked register with the lower subassembly already described. The upper subassembly (FIG. 2A) includes end plates 70-71 similar to plates 52-53, except for provision of recesses 72-73 for interlocked fit to projections 54-55. The inserted upper subassembly is secured to the already installed lower subassembly by bolt means 74.

The basic head assembly is then complete except for placement and bolting of the upper body part 40 to the lower part 41. Preferably, gasketing means such as a resilient O-ring 75 in a retaining groove 76 is located around all upwardly exposed grooves and cavities, and within the series of tapped holes for the securing bolts. It will be appreciated that such gasketing may be essentially the only special seal provision in the entire head structure, since the end-wall clearance is relatively close, for reflector-body reception in the cavity 44. As long as such clearance is close relative to the coolant-passage openings into regions 20-21-22, the coolant flow will be segregated as desired, and no special sealing is needed between these passages and regions at the indicated close-clearance end-wall fit. This of course means that all available interior space will become coolant-flooded, but the gasket means 75 assures liquid-tight retention of all circulated coolant.

The described principles of unitary construction with coolant-flooding and circulation will be understood to apply regardless of the particular light-pump and reflector configuration, and also regardless of whether the laser is of continuously-excited or pulsed-excitation variety. And it will be understood that further coolant passages may be included in the plastic head as an independent coolant-circulating system or as part of the series-connected system described.

Figure 5:
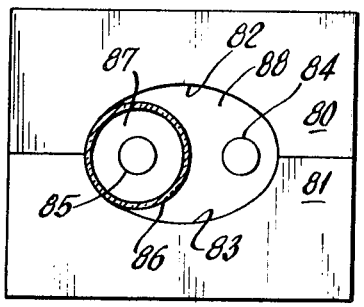
FIGS. 5, 6 and 6A are views similar to FIG. 4 to illustrate other embodiments.
Figure 6A:
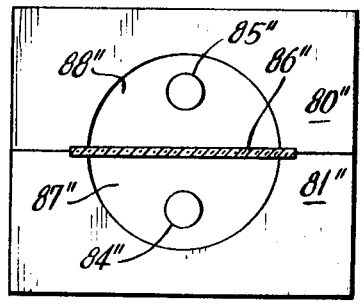
Figure 6:
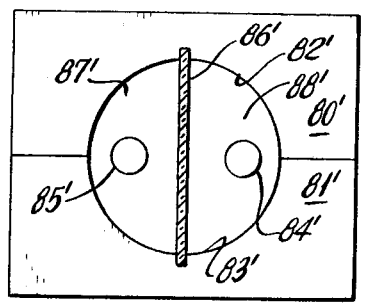

FIGS. 5 and 6 illustrate modified reflector-body configurations. In FIG. 5, the body again comprises upper and lower halves 80-81, recessed on their adjacent faces, at 82-83, to define a single elliptically cylindrical reflecting cavity, wherein the laser-rod support means 84 is aligned with one focal axis, and the light source 85 is aligned with the other focal axis. A transparent member 86 isolates a first region 87 surrounding one of these axes from a second region 88 surrounding the other of these axes.

FIG. 6 illustrates that if adequate power is obtainable from the light source 84', then the cavity need not be ellipsoidal. And for simplicity, parts in FIG. 6 have been given the same numbers as corresponding parts of FIG. 5, but with primed notation. Thus, the transparent member 86' which isolates the region 87' surrounding the source 85' from the region 88' surrounding the laser rod 84' may be a flat plate extending diametrically across the cavity volume and retained in locating grooves as shown. In FIG. 6A, there is illustrated an arrangement similar to FIG. 6, except that the transparent plate 87'' is horizontal, being assembled over the lower body half 81'' after installation of the laser-rod support means 84''. In all cases, i.e., whatever the cavity, light-pump, or laser-rod configuration, transparent means serves to isolate regions surrounding these members, and the reflector walls are directly exposed to and flooded with coolant having isolated flows through the respective regions.

The described laser-head construction will be seen to achieve the above-stated objects. In particular, the coolant-flooded nature of the structure has been found to present a tremendously enhanced power-handling capability, within a given unit-volume. The use of a transparent plastic body permits visual observation of the laser in operation, including observation of all coolant passages, for possible impediments, and when such inspection is not needed, a simple U-shaped opaque shield 90 may be placed over the plastic body 10. The shield 90 may be metallic without fear of developing short circuits, because of the electrical insulating nature of body 10, and because all metallic connections are either recessed (as at 62') or are made via the base 47. The free-flooding of the reflector surfaces has made possible greatly extended lifetimes for such lasers, without degradation of even the finest (e.g., gold) surface. The overall assembly is very rugged, and the power-to-weight ratio is high, thus making the device applicable to airborne and other moving-platform situations, without harmful effects. The clamping structure for base 47 will be understood to be optional, as dictated by application requirements.

Typically, a laser head of the invention may accommodate a laser rod 60 that is a YAG crystal (yttrium-aluminum-garnite, doped, for example, with neodymium) about 2-inch long and 0.120-inch diameter. The head is equipped with one or two 3,000-watt krypton arc lamps. The reflector body may be a 2-inch cube in which, for the FIG. 2 arrangement, the lamp-axis separation is one inch; and the transparent member 17 may be of uranium glass, 0.5-inch diameter, with a 1-mm. thick wall. The overall dimensions of the head 10 may be about $3 \times 3 \times 10$ inches. The coolant is preferably distilled water, circulated under pressure, and externally cooled as required, by suitable heat-exchanger means (not shown).

When operated in the CW mode, a typical output of 20-30 watts is obtained for a one-lamp system, and 40-100 watts for a two-lamp system. It will be understood that for system operation, two mirrors are needed on the same optical rail as used for mounting the base; one of these mirrors is a 100-percent reflector, and the other a 90–95 percent reflector. Although most of the lamp energy is dissipated as heat and is removed by the coolant flow, a portion of this energy is absorbed by the rod. The absorbed energy causes a quantum transition of electrons, being "pumped" from one energy level (ground state) to a higher energy level. When the electrons are stimulated to return to the ground state, energy is emitted in the form of a beam of coherent light energy at a wavelength of 1.06 microns.

Although the invention has been described in detail for the forms shown, it will be understood that modifications may be made without departing from the claimed scope of the invention.

I claim:

1. A unit-handling rugged laser assembly adapted for high-power continuous-wave operation, comprising a pump-reflector body having a pump-reflector cavity region including reflector-lined open-ended passage means having a longitudinal axis, the reflector material being metallic and stable in the presence of water; an elongated supporting body of optically transparent material having a recess open transverse to said longitudinal axis, said recess being sized to removably receive and to orient and support said reflector body within said opening upon insertion via said transversely open recess, and said recess being centrally located along said longitudinal axis in said supporting body; said supporting body having end regions extending longitudinally beyond the ends of said reflector body and being locally recessed adjacent to the ends of said passage means to thereby effectively extend said passage means into said end-body regions; laser-rod support means carried in said end-body regions for supporting a laser rod within and in clearance relation with said passage means; light-source support means carried in said end-body regions for supporting an elongated light source within and in clearance relation with said passage means and in laterally offset relation with a laser rod held by said laser-rod support means; an optically transparent barrier carried by said reflector body spaced from said light source and from said laser rod and separating a light-source surrounding passage from a laser-rod surrounding passage; and water-circulating means communicating with said passages for coursing a continuous flow of water along said respective passages.

2. The laser assembly of claim 1, in which said supporting body comprises two separably secured longitudinally extending parts, one of which has said recesses open to one otherwise flat longitudinal face thereof, and the other of which has a flat longitudinal recess-covering face.

3. The laser assembly of claim 1, in which said supporting body comprises two separably secured longitudinally extending parts, one of which has said first-mentioned recess open only to one otherwise flat longitudinal face thereof, and the other of which has a flat longitudinal recess-covering face.

4. A unit-handling rugged laser assembly adapted for high-power continuous-wave operation, comprising a pump-reflector body having a pump-reflector cavity region including reflector-lined open-ended passage means having a longitudinal axis, the reflector material being metallic and stable in the presence of an optical-transparent coolant liquid; an elongated supporting body of optically transparent material having a pump-reflector body recess sized to orient and support said pump-reflector body therewithin, said recess being centrally located along said longitudinal axis in said supporting body; said supporting body having end regions extending longitudinally beyond the ends of said reflector body and being locally recessed adjacent to the ends of said passage means to thereby effectively extend said passage means into said end-body regions; laser-rod support means carried in said end-body regions for supporting a laser rod within and in clearance relation with said passage means; light-source support means carried in said end-body regions for supporting an elongated light source within and in clearance relation with said passage means and in laterally offset relation with a laser rod held by said laser-rod support means; an optically transparent barrier fixedly contained within said supporting body and extending longitudinally through the cavity region and spaced from said light source and from said laser rod and separating a light-source surrounding passage from a laser-rod surrounding passage; and circulating means communicating with said passages for coursing along said respective passages a continuous flow of optically transparent coolant liquid.

5. The laser assembly of claim 4, in which said last-defined means includes an interconnection between said respective passages at one of said end-body regions, whereby the same single flow may be caused to serially course said passages.

6. The laser assembly of claim 4, in which said reflector-lined passage means comprises a surface that is elliptically cylindrical with one of its focal axes in common with the laser-rod support axis and with the other of its focal axes in common with the light-source support axis.

7. The laser assembly of claim 6, in which said barrier is an elongated optically transparent tube substantially concentrically surrounding one to the exclusion of the other of said axes.

8. A laser head according to claim 7, in which said reflector-lined passage means includes a further elliptically cylindrical surface which intersects said first-mentioned surface such that one of the focal axes of said further surface is in common with said laser-rod-support axis and the other focal axis of said further surface is substantially displaced from the illumination axis associated with said first-mentioned reflecting surface, and means for supporting a second elongated light source on an illumination axis in common with the other elliptical focal axis of said further reflecting surface; said elongated transparent tube concentrically surrounding said laser-rod-support axis to an extent for radial clearance with respect to a laser rod supported on said axis, and said tube being of such diameter as to intersect both said elliptical surfaces and thus to divide the cavity into three discrete passages open at both longitudinal ends of said reflector body and respectively inside and on spaced parts of the outside of said tube.

9. A laser head according to claim 8, in which said circulating means includes at the other of said end-body regions an interconnection between the corresponding ends of the remainder of the cavity defined by said tube and by said further reflecting surface to provide a further course of the same single flow within said remainder of the cavity.

10. A laser head according to claim 4, in which said passages define courses on axes in a common generally horizontal plane, and in which said supporting body comprises upper and lower severably secured inter-fitting parts on a generally horizontal plane above but near said common plane.

11. A laser head according to claim 10, in which the passages serving said axis of light-source support is open upwardly to the upper surface of the lower supporting-body part, whereby upon removal of the upper body part said light-source-support means may be directly accessible for selective mounting reception of a light source.

12. The laser assembly of claim 3, in which said pump-reflector body has flat parallel walls at its longitudinal ends and in which the transversely open recess in said supporting body has flat parallel end faces longitudinally spaced for close clearance relation with adjacent end walls of said pump-reflector body, said clearance relation being small compared to the respective passage connections established at said local recesses upon reflector-body assembly, and gasket means coating between peripheral adjacent surfaces of said supporting-body parts to seal against external loss of liquid at the fit of said parts, whereby predominant coolant flow will be confined to said passages without need for sealed connection of said passage means to either of said local recesses at either of said end-body regions.

13. The laser assembly of claim 6, in which said pump-reflector body comprises two halves separable in essentially a single plane through the central elongation axis thereof, said focal axes also being in said plane.

14. The laser assembly of claim 8, in which said pump-reflector body comprises two halves separable in essentially a single plane through the axes of all said focal axes.

15. A laser head according to claim 4, in which said supporting body is of a plastic material having high dielectric strength, and electric-supply connections to said light-source-support means extending through said plastic body and externally accessible.

16. A laser head according to claim 4, and including a light shield removably carried by said supporting body over a substantial portion of the external area of said supporting body.

* * * * *